Figure 8:
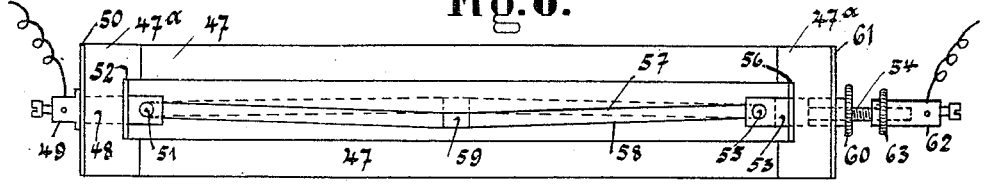

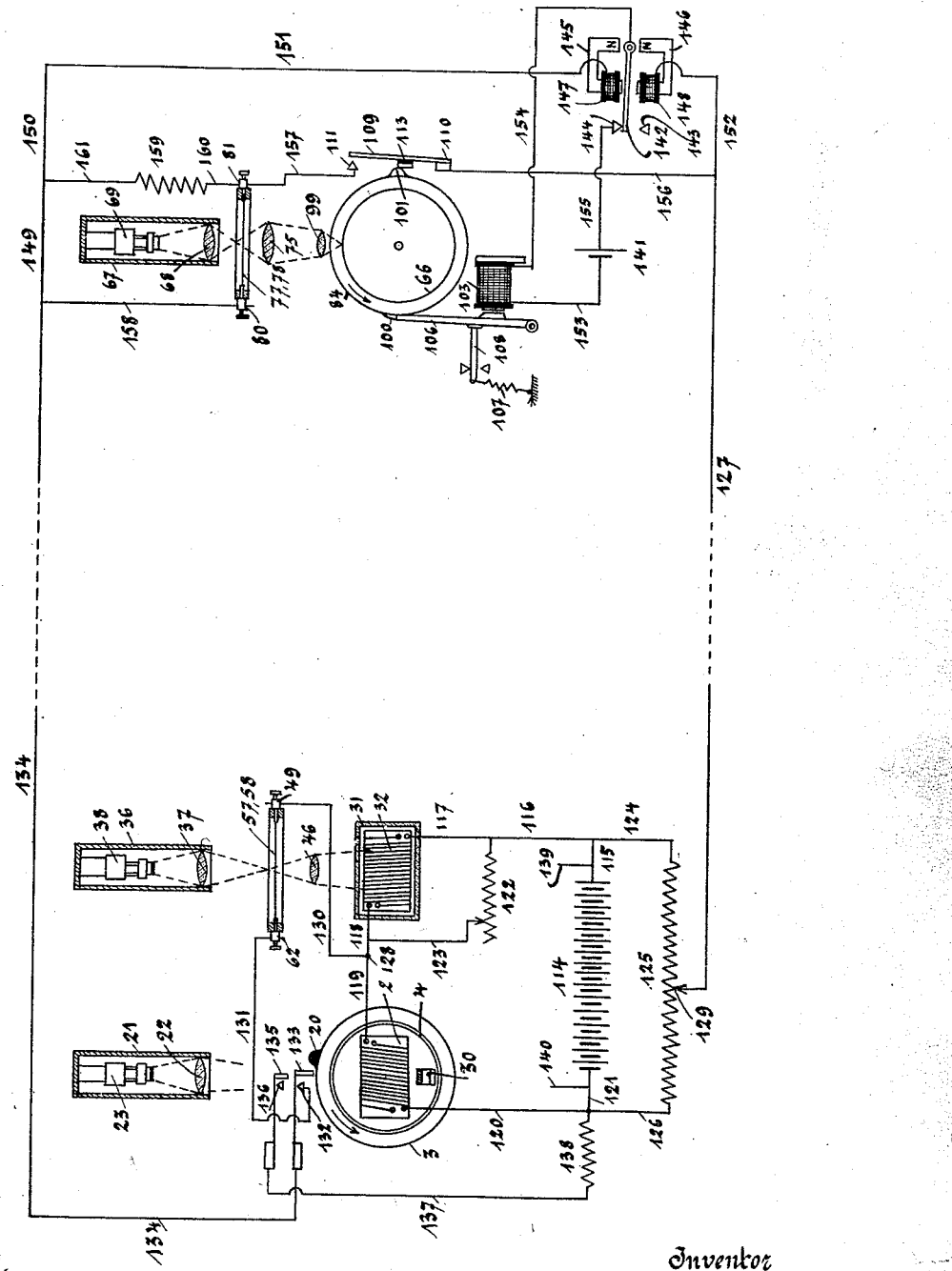

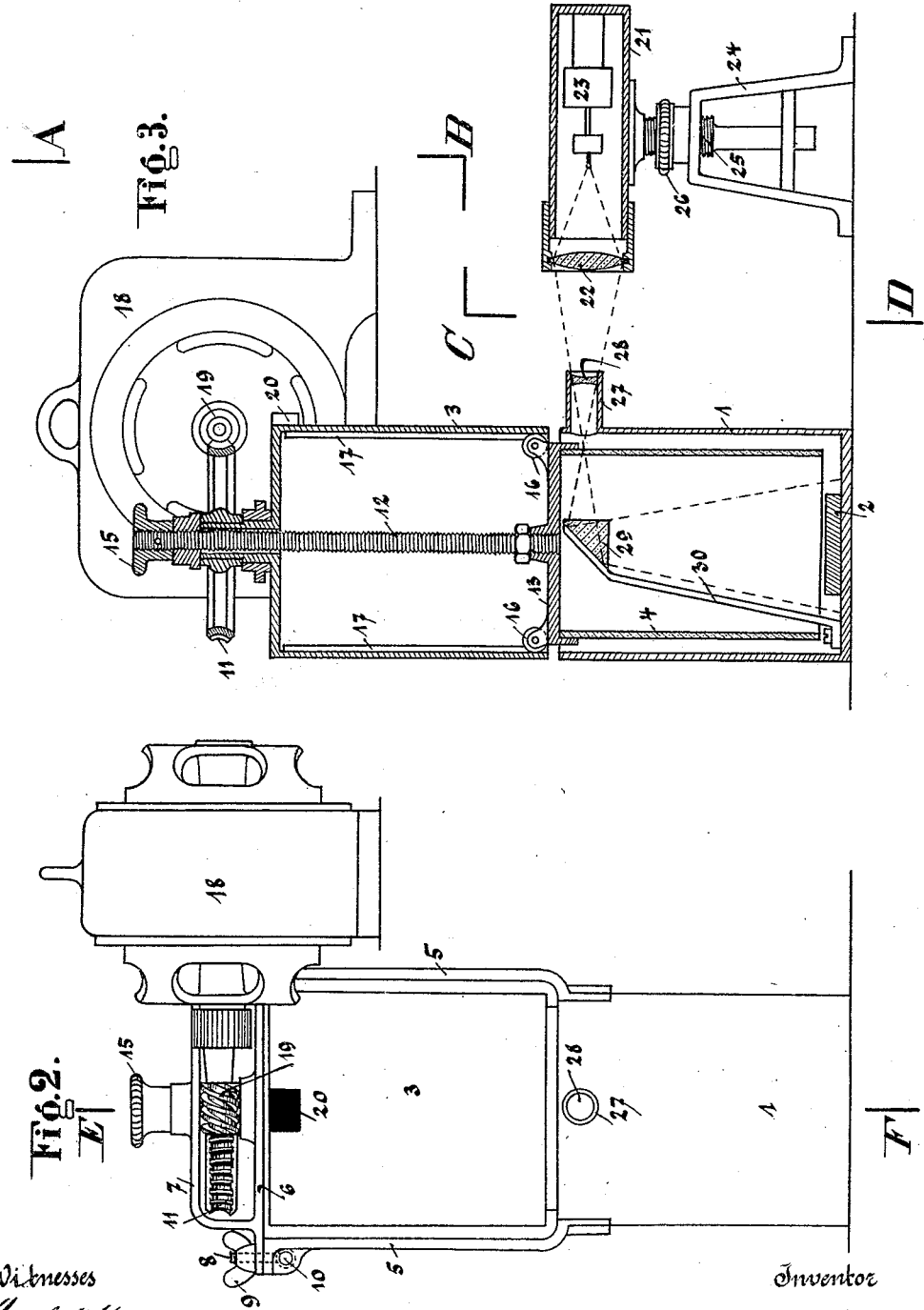

No. 888,098. PATENTED MAY 19, 1908.
A. KORN.
AUTOMATIC PHOTOTELEGRAPH.
APPLICATION FILED MAY 2, 1907.
6 SHEETS—SHEET 3.
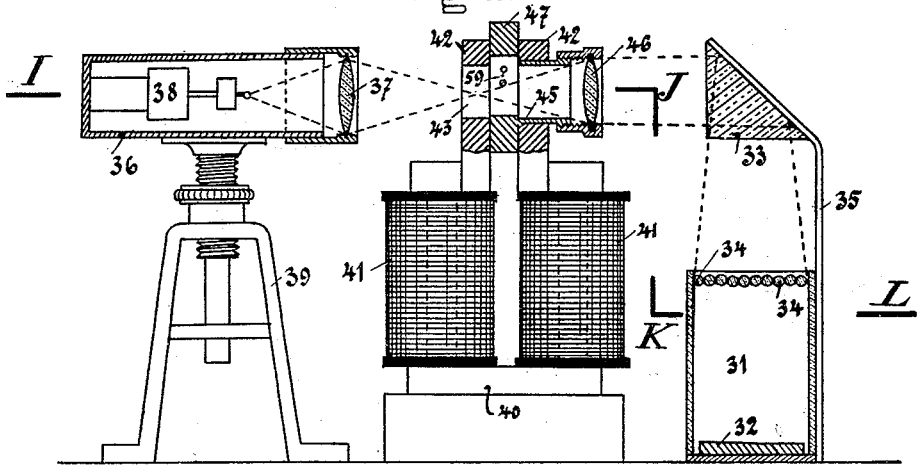
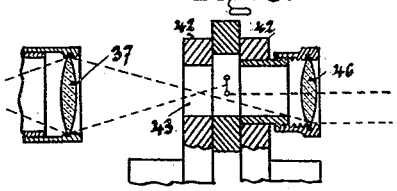
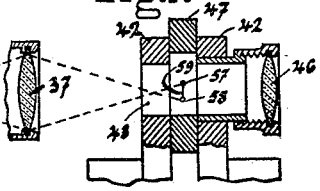
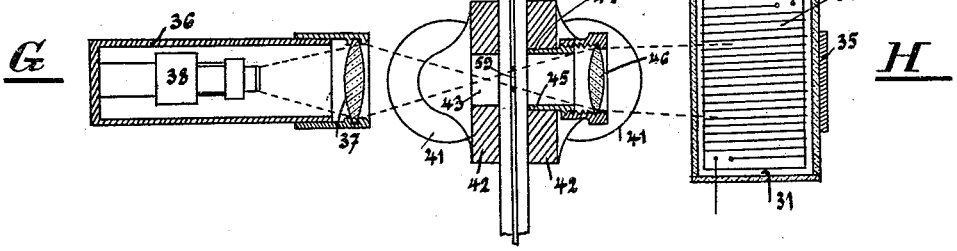
Witnesses
Carl Otthe
G. Müller
Inventor
Arthur Korn No. 888,098. PATENTED MAY 19, 1908.
A. KORN.
AUTOMATIC PHOTOTELEGRAPH.
APPLICATION FILED MAY 2, 1907.

6 SHEETS—SHEET 4.

Witnesses
Carl Otto
G. Nettles

Inventor
Arthur Korn

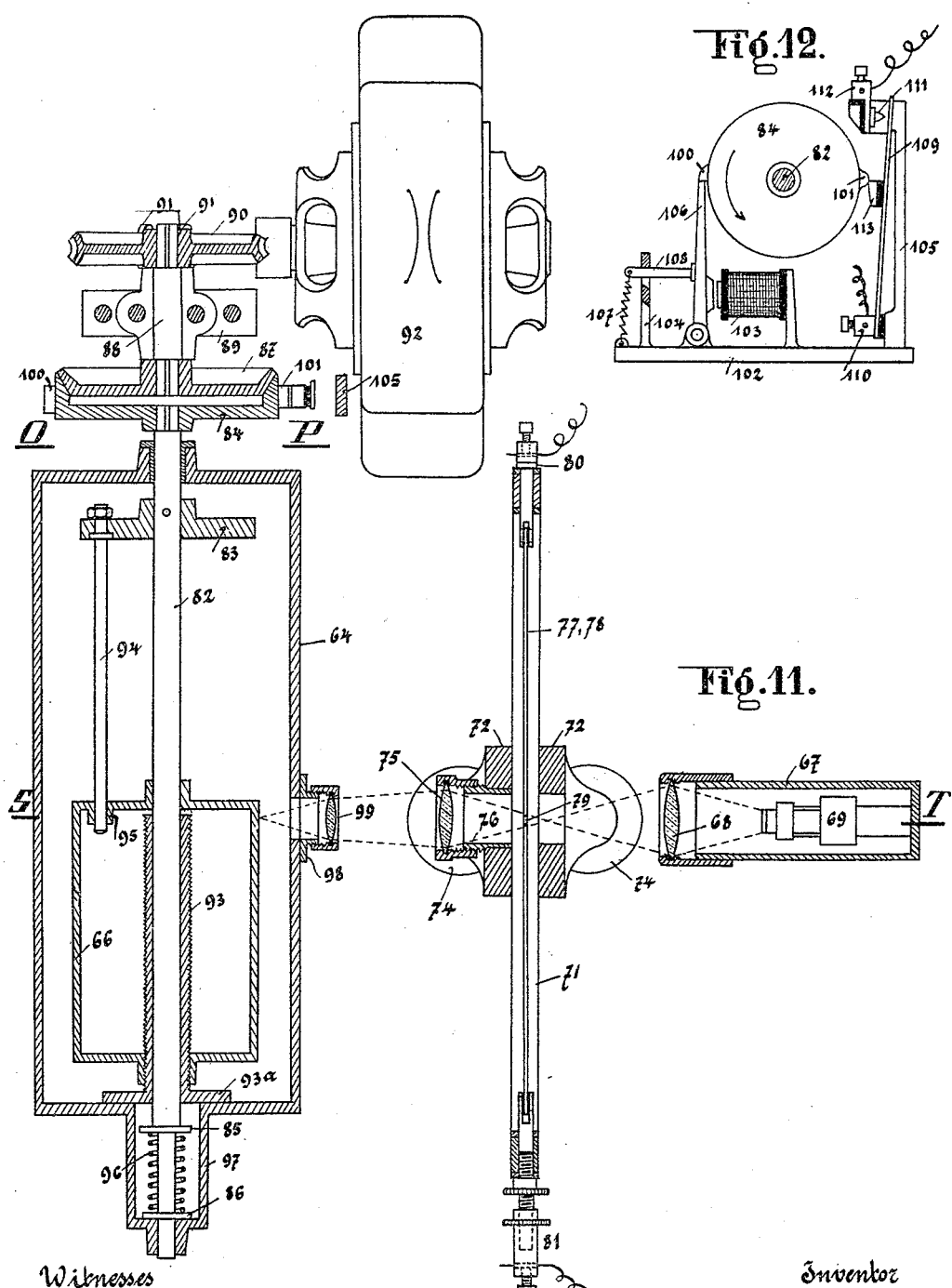

No. 888,098. PATENTED MAY 19, 1908.
A. KORN.
AUTOMATIC PHOTOTELEGRAPH.
APPLICATION FILED MAY 2, 1907.
6 SHEETS—SHEET 6.
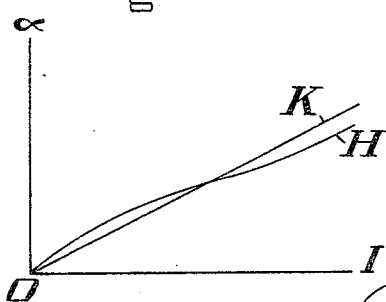
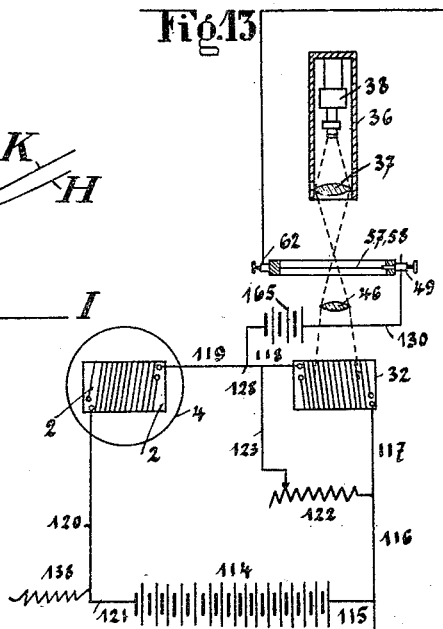
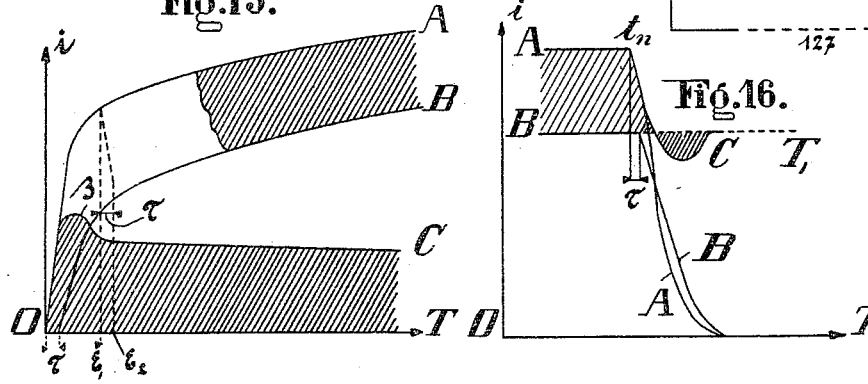
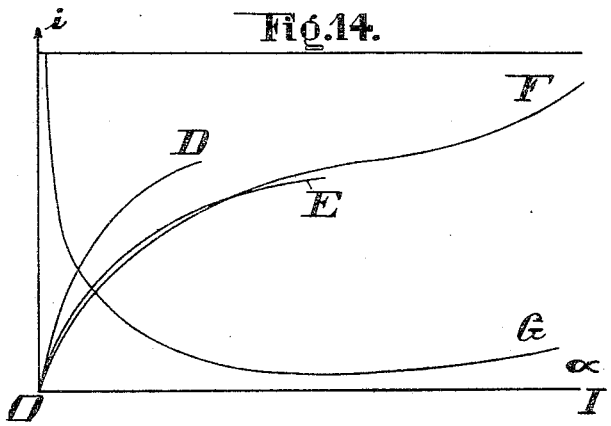
Witnesses
Inventor
Arthur Korn

UNITED STATES PATENT OFFICE.

ARTHUR KORN, OF MUNICH, GERMANY.

AUTOMATIC PHOTOTELEGRAPH.

No. 888,098.  Specification of Letters Patent.  Patented May 19, 1908.

Application filed May 2, 1907. Serial No. 371,529.

*To all whom it may concern:*

Be it known that I, ARTHUR KORN, a citizen of the Empire of Germany, residing at Munich, in the Empire of Germany, have invented new and useful Improvements in Automatic Phototelegraphy, of which the following is a specification.

My invention consists of an improved system for telegraphically transmitting photographs, pictures and the like.

In my application for a U. S. patent filed August 1, 1906, Serial No. 328,813, I have described a new "means of measuring the degree of exposure of a selenium cell", whereby improvements not only in the photometry, but also in other applications are rendered possible. In this system two selenium cells are employed, of which one is subjected to the action of light and is adapted to modify the current in a circuit, while the other selenium cell inserted in the same circuit serves for compensating the inertia of the first selenium cell. This new system may be applied to phototelegraphy, in which case the first selenium cell is disposed at the sending station and the compensating selenium cell at the receiving station. However, I have found, that this system presents the following serious drawback: Each station is required to compensate the influence of the inertia of any sending selenium cell at another station, which means, that a discourse between the two stations regarding the adjustment of the two selenium cells is necessary and takes up extremely much time. As the said compensation can be made complete only if the sending selenium cell and the compensating selenium cell or their exposures and their drops of potential thereby produced stand in a precise proportion to one another, it follows that in many cases the compensation of the influence of inertia is quite impossible. This serious drawback of the said system is according to my invention removed in the manner, that the compensating selenium cell with its accessories is disposed not at the receiving station as hitherto, but at the sending station. Thereby the sending station is rendered quite independent of all the other stations, as it requires for the compensation of the inertia only a certain set of sending and compensating selenium cells, which are adjusted once for all with regard to one another and are therefore ready for use at any moment without any further regulation or readjustment. Instead of the galvanometers employed in the previous system I now employ galvanometers of a special kind as described in my application for a U. S. patent filed January 25th 1907, Serial No. 354082 and entitled "Telautograph". As explained in the said application this special galvanometer presents the advantage, that thereby an exceedingly high speed in the production of the image at the receiving station is obtained, which speed only depends on the speed of the variations of the current.

My improved phototelegraphic system comprises two lines of transmission between the two stations, one of these lines serving as a return line. As a current in proportion to the sensitiveness of the sending selenium cell is to be sent direct over the lines of transmission, the improved system is rendered practicable and economic in the manner, that both the sending and the compensating selenium cells are given so high an internal resistance, that even the maximum resistance of the lines of transmission, that may occur, can be neglected with regard to the resistance of each selenium cell. With the previous system the resistance of the compensating selenium cell was permitted to be small.

I will now proceed to describe my new system with regard to the accompanying drawings, in which—

Figure 10:
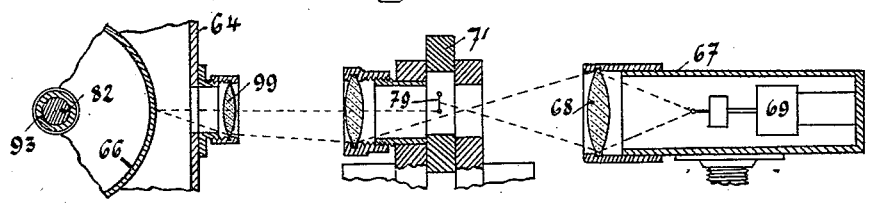
Figure 9:
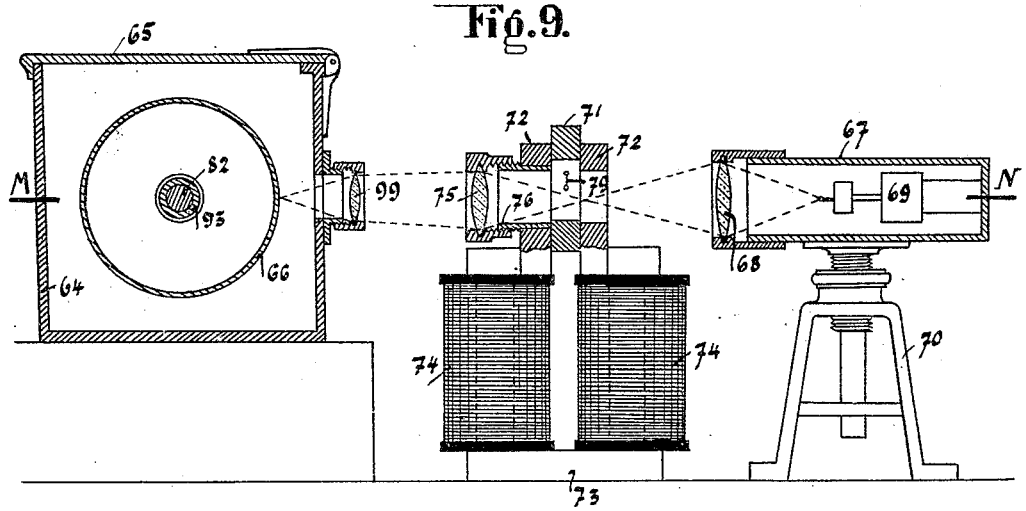

Figure 1 shows diagrammatically a phototelegraphic system, Fig. 2 is a vertical section through the broken line A—B—C—D in Fig. 3 and shows in elevation a transmitting apparatus, Fig. 3 is a vertical section through the same on the line E—F in Fig. 2, Fig. 4 is a vertical section through the line G—H in Fig. 5 and shows a compensating apparatus, parts being shown in elevation, Fig. 5 is a horizontal section through the same on the broken line I—J—K—L in Fig. 4, Figs. 6 and 7 are each a part out of Fig. 4 and illustrate different positions of the intercepter Fig. 8 is an elevation of the galvanometer frame shown in Figs. 4 to 7, Fig. 9 is a vertical section through a receiving apparatus on the line S—T in Fig. 11, Fig. 10 is a part out of Fig. 9 and shows another position of the intercepter, Fig. 11 is a horizontal section through the receiving apparatus on the line M—N in Fig. 9, Fig. 12 is a vertical section on a reduced scale through the line O—P in Fig. 11, Fig. 13 shows a system, which is similar to a potentiometer and is nearly equivalent to the system shown at Fig. 1, Fig. 14 is a diagram to illustrate the manner, in which the current through a selenium cell depends upon the exposure of the latter to a light, and in which the consumption of current of a galvanometer to be hereinafter described depends upon its angle of deflection, Fig. 14$^a$ is a diagram which will be referred to later on, Fig. 15 is a diagram and shows the curves of currents both in the two selenium cells and in the bridge for a sudden and constant exposition to light, and Fig. 16 is a diagram and shows the curves of currents both in the two selenium cells and in the bridge for a sudden reduction of the degree of lucidity in the exposition to light down to another constant degree of lucidity.

Similar characters of reference refer to similar parts throughout the several views.

The phototelegraphic system shown at Fig. 1 comprises a transmitting apparatus and a compensating apparatus at the sending station and a receiving apparatus at the receiving station.

The transmitting apparatus is shown at Figs. 2 and 3 and comprises a sending selenium cell 2 on the bottom of a cylindrical vessel 1, a rotary hollow drum 3 and a hollow platen-roll 4, on which the transparent original (a film or the like) can be placed and secured in any known manner. The hollow drum 3 is mounted to turn with its nave in the lower part 6 of a cross support 6, 7 and a worm wheel 11 inserted between the two parts 6 and 7 of this support is fastened on the nave of the drum 3, so that the latter is only permitted to turn. The drum 3 is provided with a cam 20 of india rubber, which will be referred to later on. A vertical screw spindle 12 passes through the hollow nave of the drum 3 and engages in the upper part 7 of the support 6, 7. The lower end of this screw spindle 12 is secured in a circular disk 13, to which the platen-roll 4 of glass is attached. In suitable bearings on the disk 13 two or more rollers 16, 16 are mounted to turn, so that they can roll on rails 17, 17 on the inside of the rotary drum 3 and thus prevent the platen-roll 4 from turning within the rotary drum 3. An electromotor 18 of any known construction and placed on some support (not shown) is adapted to drive by means of a worm 19 the worm wheel 11 and thereby the platen-roll 4. It is essential, that this electromotor 18 be made to run at a uniform and constant speed. Preferably it is a shunt motor which in a known manner can be adjusted for a certain number of revolutions by means of an adjustable resistance inserted in the shunt (comprising the coils of its field magnets). The pitch of the screw spindle 12 is made such, that the platen-roll 4 is longitudinally shifted through a minute distance for every revolution. The electromotor 18 may run in such a direction as to gradually lower the platen-roll 4, so that the operator watching the knob 15 fastened on the screw spindle 12 will know the moment at which the platen-roll 4 will reach its lowest position. It is also evident, that the operator can withdraw the platen-roll 4 from the vessel 1 by means of the rotary drum 3, after he has unscrewed the winged nuts 9, 9 and turned the bolts 8, 8 downwards round pins 10, so as to remove the cross support 6, 7 from the two standards 5, 5. The transmitting apparatus also comprises a device for projecting rays of light on the sending selenium cell 2. In Fig. 3 this device is shown as consisting of a tube 21 with an adjustable lens 22 of any known construction, either simple or compound, and a source of light, for example a known Nernst incandescent electric lamp 23. The tube 21 may be vertically adjusted in a support 24 by means of a screw spindle 25 and an adjusting nut 26.

The vessel 1 is provided with a tubular connection 27 and a lens 28 of any known construction. The two lenses 22 and 28 should be so adjusted as to place the focus of the pencil of rays of light (indicated by dotted lines) exactly on the transparent original, which is put round the platen-roll 4. A prism 29 is disposed within the vessel 1 and is supported by a suitable support 30 on the bottom. The prism 29 is arranged for deflecting the diverging pencil of rays on the sending selenium cell 2 in the manner clearly shown. The device described is so placed, that the focus of the pencil of rays of light may meet every point of the transparent original on the periphery of the platen-roll 4 during the rotation of the latter and from the one side to the other side of the original during the longitudinal motion of the platen-roll 4, the said focus describing a helical line. The original may be a photograph or a drawing or a picture or the like.

The compensating apparatus is shown at Figs. 4 to 8 and comprises a box 31, a compensating selenium cell 32 on the bottom of the same, a prism 33, a device for projecting rays of light and a galvanometer of a special kind. All the sides of the box 31 are formed of mirrors and the box 31 is closed by a horizontal row of juxtaposed cylinder-lenses 34, 34. The prism 33 may be held above the cylinder-lenses 34, 34 by means of a suitable support 35 fastened on the box 31. The device for projecting rays of light may be of the same construction as that of the transmitting apparatus described above. Its parts are denoted by 36 to 39. The galvanometer shown comprises an electromagnet, a frame and an intercepter. The electromagnet consists of a horseshoe core 40 and two coils 41, 41 on the legs of same. The two poles 42, 42 of the core 40 are enlarged and are placed near each other. They are provided with two round cross holes 43 and 44 in a line with the axis of the tube 36 and in one hole 44 a short tube 45 may be secured, on which a lens 46 of any known construction can be adjusted. Between the two poles 42, 42 of the electromagnet the frame is secured in any known manner. This frame is formed of two long brass parts 47, 47 (see Fig. 8) and two short india rubber parts 47ª, 47ª. In one short part 47ª (on the left in Fig. 8) of the frame a hole of rectangular cross section may be provided, in which a metallic rod 48 of the same section engages. This rod 48 is made in one piece with a binding post 49, which is made to bear on a metallic plate 50 on the frame. The internal end of the rod 48 is vertically slotted and is provided with a horizontal pin 51. A metallic plate 52 may be secured on the inside of the rubber part 47ª for preventing the rod 48 from turning. In the other short part 47ª (on the right in Fig. 8) a similar hole of rectangular cross section may be provided, in which a short rod 53 is longitudinally guided. This rod 53 is made in one piece with a screw 54 outwardly projecting and is at its internal end vertically slotted and provided with a horizontal pin 55. It is prevented from turning by a metallic plate 56 fastened on the inside of the part 47ª. A thin doubled metallic wire 57, 58 is passed round one pin 51 and its two ends are soldered or otherwise fastened on the other pin 55. The two pins 51 and 55 having practically the same diameter, it will be understood, that the two wires 57 and 58 will be parallel to each other. The two wires 57 and 58 are to serve as conductors. A thin little plate 59 impermeable to light, say of aluminium or other opaque material, is stuck to the two conductors 57 and 58 in the vertical central plane of the two holes 43 and 44 and serves as an intercepter as will be hereinafter described. By means of a nut 60 on the screw 54 and bearing on a metallic plate 61 on the frame part 47ª the two conductors 57 and 58 can be more or less and uniformly tightened. On the external end of the screw 54 a binding post 62 may be fastened by means of a nut 63. Normally the aluminium plate or intercepter 59 may occupy an extreme lower position shown in full lines in Fig. 8. When an electric current passes through the two conductors 57 and 58 in one direction, say from the binding post 49 to the binding post 62, the aluminium plate or intercepter 59 will be more or less shifted upwards (in other words in a plane at right angles to the magnetic lines of force) in accordance with the strength of the current. For the maximum strength of the current the intercepter 59 may occupy an extreme upper position indicated by the dotted lines in Fig. 8. By means of the nut 60 it is possible to so adjust the tension of the two wires 57 and 58 with regard to the strength of the current, that the two extreme positions of the aluminium plate or intercepter 59 shall be at a certain vertical distance from each other, as will be hereinafter described. The conductors 57 and 58 may also be metallic threads or thin and narrow metallic strips or ribbons.

The lens 37 is so adjusted as to more or less concentrate the light on the aluminium plate or intercepter 59 in its normal position (see for example Fig. 7) in accordance with the degree of lucidity of the light to which the compensating selenium cell 32 is to be subjected. The opposite lens 46 is so adjusted as to produce a real image of the aluminium plate or intercepter 59 in the plane of the row of cylinder-lenses 34, 34, which image should be at least as large as this row or a little larger. If the two conductors 57 and 58 are without current, the real image of the aluminium plate 59 should completely cover the whole series of cylinder-lenses 34, 34, when the compensating selenium cell 32 will not be exposed at all to the light, but remain in the dark. The moment, however, that a current passes through the two conductors 57 and 58, the intercepter 59 will be raised in accordance with the strength of the current, so that the real image of the intercepter 59 will move from right to left in Fig. 4 and more or less uncover the series of cylinder-lenses 34, 34. The latter will deflect the light on the right and left mirrors in the box 31. Owing to the repeated reflection of the light by the mirrors the partial light will be uniformly distributed over the whole compensating selenium cell 32, so that the intensity of the light acting upon the cell will be practically proportional to the deflection of the aluminium plate or intercepter 59 of the galvanometer. Fig. 7 illustrates for example the normal position of the intercepter 59, in which no light will be permitted to act upon the selenium cell 32. Fig. 4 shows the intercepter 59 in its highest position, so that the intensity of the light acting upon the cell 32 will have its maximum. Fig. 6 shows the intercepter 59 in its middle position, so that the intensity of the light acting upon the cell 32 will be half of the maximum.

The receiving apparatus is shown at Figs. 9 to 12. It comprises a photographing galvanometer, a device for projecting a pencil of rays of light, a receiving platen-roll 66 within a box 64, and means for driving the platen-roll 66. The device for projecting rays of light may be of a similar construction as the previously described device, it consisting of a tube 67, an adjustable lens 68 and a source of light, for example a known Nernst incandescent electric lamp 69. The tube 67 may be vertically adjustable in a support 70 (see Fig. 9). The photographing galvanometer shown is substantially of the same construction as the compensating galvanometer described above with reference to Figs. 4 to 8. It comprises a frame 71 between the two poles 72, 72 of the horseshoe core 73, two coils 74, 74 and an adjustable lens 75 on the short tube 76 in one pole 72. The two conductors in the frame 71 are denoted by 77 and 78, the intercepter by 79, and the two binding posts by 80 and 81. Fig. 9 shows the intercepter 79 in its highest position, in which it permits all the rays of light (indicated by dotted lines) to pass from the lens 68 to the other lens 75. Fig. 10 shows the intercepter 79 in its middle position, in which it intercepts one half of the rays of light.

The box 64 and its cover 65 form a camera obscura, in which a shaft 82 is mounted to turn. It has fast on it a disk 83 within and a disk 84 without the box 64 and loose two collars 85 and 86. The disk 84 forms one member of a friction clutch, whose other member 87 is driven from the armature shaft of an electromotor 92 by means of a worm 91, a worm wheel 90 and a shaft 88 journaled in a bearing 89. The electromotor 92 is preferably of the same kind as the electromotor 18 of the transmitting apparatus. An externally screw-threaded tube 93 is made to fit on the shaft 82 and is fastened with its flange 93$^a$ on the inside of the box 64, so that the shaft 82 is permitted to turn and to longitudinally shift in the tube 93. One nave of the platen-roll 66 is internally screw-threaded and engages the screw-thread of the tube 93, while the other nave of the former is adapted to longitudinally move on the shaft 82. The platen-roll 66 is prevented from turning on the shaft 82 by a rod 94, which is parallel to the shaft 82 and is fastened at its one end in the disk 83 mentioned above, while it engages in a hole 95 of the platen-roll 66. It will be seen, that on the shaft 82 being driven from the electromotor 92 by means of the friction clutch the disk 83 will take along with it the platen-roll 66 by means of the rod 94, so that the platen-roll 66 will be longitudinally shifted through a minute distance like the pitch of the screw-thread on the stationary tube 93 during every revolution.

A helical spring 96 is inserted between the two loose collars 85 and 86 and serves for pressing the member 84 on the other member 87 of the friction clutch by means of the shaft 82, so as to produce the necessary friction between the two members 84 and 87. The collar 86 will bear on the bottom of a small box 97 and the other collar 85 against a shoulder of the shaft 82. The box 64 is provided with a tubular connection 98, on which an adjustable lens 99, either simple or compound, is put. The lens 99 requires to be in a line with the axis of the tube 67 and the lens 75, which axis is preferably placed at right angles to the shaft 82 and is made to cross the same.

A sensitive film, paper or the like can be placed on the periphery of the platen-roll 66 and may be fastened thereon in any known manner. The two lenses 75 and 99 are so adjusted as to place the focus of the dotted pencil of rays of light on the sensitive film, paper or the like. It will be understood, that the intensity of the light acting upon the respective point of the sensitive film will be varied in accordance with the shifting position of the intercepter, in other words in proportion to the strength of the current passing through the two conductors 77 and 78. The axis of the tube 67 and of the three lenses 68, 75 and 99 is so placed with reference to the box 64, that the pencil of rays of light can act upon consecutive points of the sensitive film during the rotation and longitudinal motion of the platen-roll 66, it describing a helical line on the same. Evidently the external diameters of the two platen-rolls 4 and 66 in the transmitting and receiving apparatus and the pitches of the screw spindle 12 and of the screw-thread on the tube 93 will require to be alike, if the scale of the copy (that is the photograph to be produced) is to be the same as that of the original to be transmitted.

The member 84 of the friction clutch is provided with a tooth 100 and a cam 101, see Fig. 12. On a suitable base plate 102 an electromagnet 103, a slotted stop 104 and a pillar 105 are disposed, while a pawl 106 is mounted thereon to rock. A helical spring 107 tends to turn the pawl 106 out of the path of the tooth 100 by means of a stud 108, which bears on one end of the slot in the stop 104. The electromagnet 103 is adapted on being energized to attract the pawl 106 and to bring it into the path of the tooth 100. In this case the stud 108 will bear on the other end of the said slot, which is so shaped as to keep the pawl 106 out of contact with the periphery of the disk 84, so as to avoid an unnecessary friction. On the pillar 105 a contact spring 109 is fastened and insulated therefrom, while it is electrically connected with a binding post 110. The contact spring 109 is adapted to normally bear on a contact piece 111, which is fastened on the cranked upper end of the pillar 105 and is insulated therefrom, while it is electrically connected with a binding post 112. The contact spring 109 is between its two ends provided with a beveled-off piece 113, which is insulated from it and is adapted to work with the cam 101 on the disk 84. The tooth 100 and the cam 101 are so disposed, that during every revolution of the shaft 82 in the direction of the arrow shown the cam 101 will first push off the contact spring 109 from its contact piece 111, so as to break the respective circuit to be described later on, before the tooth comes in contact with the pawl 106, when the member 84 will stop and slide on the other member 87 of the friction clutch. Only on the electromagnet 103 becoming without current will the helical spring 107 be able to detach the pawl 106 from the tooth 100, whereupon the disk 84 with the shaft 82 will be permitted to turn. The sensitive film, paper or the like should be preferably so disposed on the platen-roll 66, that during the periodic stoppage of the latter any pencil of rays of light, which may happen to be produced from some reason, is not permitted to act upon the sensitive film, but on the space between its two neighboring edges, in other words on the known clamping device.

The phototelegraphic system illustrated in Fig. 1 shows the special arrangement of the various apparatus described above, which special arrangement is essential for carrying into effect my invention. The essential parts of the several apparatus being denoted by similar characters of reference as in the other figures referred to above, it is easy to recognize the different apparatus.

The selenium cells 2 and 32 of the transmitting and compensating apparatus respectively are connected in series with a source of current, say a battery 114, by lines 115, 116, 117, 118, 119, 120 and 121. An adjustable resistance 122 may be connected with the battery 114 in multiple with the compensating selenium cell 32 by means of a line 123. Lines 124 and 126 connect the battery 114 with an adjustable resistance 125, on which any point 129 may be selected for connecting it with a return line of transmission 127, which connects the sending station with the receiving station. The adjustable resistance 125 is to serve as an equalizer. A juncture 128 between the sending cell 2 and the compensating cell 32 is connected by a line 130 with the binding post 49 of the galvanometer of the compensating apparatus. The other binding post 62 of the same is connected by a line 131 with a contact piece 132 (similar to 111 in Fig. 12), on which a hooked contact spring 133 is made to normally bear. The free end of this hooked contact spring 133 is adapted to work with the india rubber cam 20 on the drum 3 (see Fig. 2), while it is normally kept out of contact with the periphery of the drum 3 by the contact piece 132. The cam 20 is preferably so disposed on the drum 3, that it pushes off the contact spring 133 from the contact piece 132 during that time, during which the focus of the rays of light (see Fig. 3) does not meet the original but the space between two neighboring edges of the same. The stationary end of the contact spring 133 is connected with the line of transmission 134. Another hooked contact spring 135 is disposed and normally bears on a stop 136, whereby it is kept out of contact with the contact spring 133. The latter is adapted on being pushed off its contact piece 132 by the cam 20 to come in contact with the other contact spring 135. The stationary end of the contact spring 135 is connected with the positive pole of the battery 114 by a line 137 and a resistance 138. The source of light 23 in the tube 21 and the terminals of the shunt motor 18 (Figs. 2 and 3) of the transmitting apparatus, as well as the source of light 38 and the two coils 41, 41 (Fig. 4) of the galvanometer of the compensating apparatus are to be supplied with current from some source or they may receive the current from the battery 114 through the lines 140 and 139.

At the receiving station a local circuit with a battery 141 is disposed for supplying the electromagnet 103 (see Fig. 12) with a current. A switch 142 is inserted in this circuit and is formed as the armature of a polarized relay comprising two opposite permanent horseshoe magnets 145 and 146. On the unmarked poles of these magnets are disposed two coils 147 and 148 which are wound and act in the same sense and are shunted to the photographing galvanometer 80, 77/78 and 81 by means of the lines 149, 150, 151 and 152. This polarized relay is so adjusted as not to work when the currents serving for the transmission of photographs circulate. The armature 142 is to normally bear against a contact piece 144, which in any known manner is so adjusted, that only a strong line current is able to detach the armature 142 from the contact piece 144. The coil of the electromagnet 103 is connected with the battery 141 by a line 153 and with the pivot of the switch 142 by a line 154, while the battery 141 is connected with the contact piece 144 by a line 155.

The binding post 110 of the contact spring 109 is connected with the return line of transmission 127 by a line 156 and the other binding post 111 is connected with that 81 of the photographing galvanometer by a line 157. The other binding post 80 of the said galvanometer is connected with the line of transmission 134 by a line 158 and a resistance 159 is connected with the said line 134 in multiple with the galvanometer by lines 160, 161 and 149.

The sending selenium cell 2, the compensating selenium cell 32 and the two parts of the adjustable resistance 125 (divided by the sliding contact 129) form the four arms of a Wheatstone bridge; they are connected with one another by lines 124, 116, 117—118, 119—120 and 126. The resistance 125 is considerably smaller than that of the two selenium cells 2 and 32, the former amounting to about 1/100th to 1/30th only of the latter. This resistance 125 merely serves as an equalizer. The said Wheatstone bridge is supplied with current from the battery 114 through the lines 121 and 115. In its bridge are inserted the compensating galvanometer and the photographing galvanometer with the two lines of transmission (see the course 128, 130, 49, 57/58, 62, 131, 132, 133, 134, 158, 80, 77/78, 81, 157, 111, 109, 110, 156, 127 and 129).

The source of light 69 in the tube 67 and the two coils 74, 74 (Fig. 9) of the photographing galvanometer and the terminals of the shunt motor 92 (Fig. 11) for the receiving apparatus are to be supplied with current from some source (not shown).

The system described operates as follows: In order to make corrections of differences in the simultaneous work of the two platen-rolls 4 and 66 only in one direction and thus to save complications and trouble, I prefer to let the electromotor 92 at the receiving station run at a slightly larger speed, for example 1% quicker, than the electromotor 18 at the sending station. The operator at the sending station may allow his electromotor 18 to normally stop. After having applied an orignial to be transmitted to his platen-roll 4 and after having replaced the latter with the drum 3 he starts his electromotor 18 to put the platen-roll 4 in motion. The rays of light passing from the source of light 23 through the changing point on the original will more or less act upon the sending selenium cell 2 for more or less reducing its resistance, so that a larger or smaller current will pass from the battery 114 through the lines 121 and 120, the selenium cell 2, the lines 119 and 130, the conductors 57, 58 of the compensating galvanometer, the line 131, the contact piece 132, the contact spring 133, the line of transmission 134, the line 158, the conductors 77, 78 of the photographing galvanometer, the line 157, the contact piece 111, the contact spring 109, the binding post 110, the line 156, the return line of transmission 127, the right part of the resistance 125 and the lines 124 and 115 back to the battery 114. As the compensating selenium cell 32 will be now more or less subjected to the action of the rays of light from the source 38 and in the same proportion as the sending selenium cell 2, the consequence will be that a greater or smaller part of the current will now pass from the juncture 128 through the line 118, the compensating selenium cell 32, and the lines 117, 116 and 115 back to the battery 114. At the receiving station the intercepter 79 on the two conductors 77 and 78 of the photographing galvanometer will be more or less shifted upwards in proportion to the strength of the current, so that a more or less intensive pencil of rays of light will act upon the shifting point on the sensitive film on the platen-roll 66.

The strength of the current passing through the sending selenium cell 2 does not vary in the exact proportion to the intensity of the pencil of rays of light passing through the shifting point on the original, as will be hereinafter explained. For this reason I dispose the compensating selenium cell 32 at the sending station as shown in Fig. 1 and I thereby obtain the effect, that the current passing from the juncture 128 through the conductors of both the compensating galvanomoter and the photographing galvanometer will be practically constantly in complete harmony with the intensity of the pencil of rays of light after its passage through the original independently of the duration of the present exposure of the sending selenium cell 2 to this light and of the intensity of its preceding exposure. Therefore the impression produced by the photographing pencil of rays of light on the sensitive film will be in thorough accordance with the degree of lucidity of the respective point on the original.

The two platen-rolls 4 and 66 at both stations may at the commencement occupy different positions, that is to say, the momentary point on the original through which the pencil of rays of light passes may be at a distance from one edge of the original, which distance is different from the distance between the corresponding edge of the sensitive film and the momentary point on which the photographing pencil of rays of light acts. Let us first assume, that the cam 20 on the drum 3 at the sending station now strikes the hooked contact spring 133, while the cam 101 on the disk 84 at the receiving station is still at some angle from the piece 113 on the contact spring 109, so that the latter continues bearing on the contact piece 111. Then the cam 20 will push off the contact spring 133 from the contact piece 132 and press it on the hooked contact spring 135. Thereby the compensating galvanometer will be switched off, so that it will henceforward be protected from disturbances by the current. As the resistance 138 is very much smaller than that of the sending selenium cell 2, a larger current will pass from the battery 114 through the resistance 138, the line 137, the contact spring 135, the contact spring 133, the line of transmission 134, the line 158, the conductors 77 and 78 of the photographing galvanometer, the line 157, the contact piece 111, the contact spring 109, the line 156, the return line of transmission 127, the juncture 129, the right part of the resistance 125, and the lines 124 and 115 back to the battery 114. At the same time a small part of the current may pass from the line of transmission 134 through the lines 149, 150 and 151, the coils 147 and 148 of the two electromagnets 145 and 146 and through the line 152 to the other line of transmission 127, without producing any visible effect. After a time the cam 101 on the disk 84 will strike the piece 113 and thereby push off the contact spring 109 from its contact piece 111, whereby the photographing galvanometer will be switched off. Soon afterwards the tooth 100 on the disk 84 will strike the pawl 106, so that the disk 84 with the receiving platen-roll 66 will stop, while the transmitting platen-roll 4 continues to rotate. When at last the cam 20 on the drum 3 strikes the contact spring 133 and pushes the same off the contact piece 132 and presses it on the contact spring 135, the positions of the two platen-rolls 4 and 66 will correspond to each other. The compensating galvanometer being now also switched off, a greater current will pass from the battery 114 through the line 121, the resistance 138, the line 137, the contact spring 135, the contact spring 133, the line of transmission 134, the lines 149, 150 and 151, the coils 147 and 148, the line 152, the return line of transmission 127, the juncture 129, the right part of the resistance 125, and the lines 124 and 115 back to the battery 114. Thereby the switch 142 will be detached from its contact piece 144 for opening the circuit of the battery 141, so that the helical spring 107 will press the stud 108 on the other stop and thereby withdraw the pawl 106 from the tooth 100, whereupon the disk 84 and the receiving platen-roll 66 will commence to rotate and in synchronism with the transmitting platen-roll 4. Henceforward the receiving platen-roll 66 will stop for a moment after every revolution and will be again released by the cam 20 striking and pushing off the contact spring 133. Thus the synchronism of the two platen-rolls 4 and 66 is insured in a simple manner. After the whole surface of the sensitive film has been subjected to the action of the photographing pencil of rays of light, the operator at the sending station watching the knob 15 will know this and stop his electromotor 18. The receiving platen-roll 66 will stop after the tooth 100 on the disk 84 has struck the pawl 106. It can be taken out of the box 64 and the image produced in the sensitive film, paper or the like can be developed as usual.

The resistance 159 at the receiving station is connected with the two lines of transmission 134 and 127 in multiple with the photographing galvanometer 77, 78 by means of the lines 160, 161, 149 and 158 and serves for damping the two conductors 77, 78 in a known manner and thereby rendering the photographing galvanometer aperiodic. As a rule the resistance 159 should be made at least eight times that of the galvanometer 77, 78 itself. The resistance of the polarized relay 145, 146, 147, 148 is on the average made about 200 times that of the photographing galvanometer.

The principal advantage of the improved system has already been set forth in the introductory part of this specification, viz. that the sending station is rendered quite independent of all the other stations and is enabled to use its sending and compensating selenium cells, which are adjusted once for all, for the transmission of an original to any other station without any previous lengthy discourse over distance.

Further important advantages of the improved method are as follows:

1:—The drop of potential for the two parallel lines of transmission is reduced, since the quantities of current required to circulate in the sending circuit in view of the resistance in the dark of the sending selenium cell and in view of its inertia are kept off from the lines of transmission. The sum of these two quantities of current is nearly always a multiple of the current sent over the lines of transmission for operating the photographing galvanometer at the receiving station.

2:—It is possible and easy for the sending station to control the operation of the system, since the conductors 57 and 58 of the compensating galvanometer must necessarily make the same motions as those 77 and 78 of the photographing galvanometer at the receiving station, so that when watching the compensating apparatus the operator will know, whether in the system everything is all right or not. If either selenium cell at the sending station should fail to work properly, it is easy for him to at once put the system again in working order by merely replacing his two selenium cells 2 and 32 by fresh ones, which have been previously adjusted to work together, so that no discourse whatever need take place between the two stations. It is even possible to switch off the two lines of transmission 134 and 127 and to replace them by a suitable resistance for testing the two fresh selenium cells, the electromotor 18 of the transmitting apparatus being started and thus the compensating apparatus set to work. When everything has been found to be in order, the two lines of transmission 134 and 127 may be switched on for transmitting the original to the receiving station.

Besides the phototelegraphic system shown at Fig. 1, which resembles a Wheatstone bridge, also a modified system shown at Fig. 13 may be used for carrying into effect my invention. This modified system is similar to a potentiometer. All the corresponding parts in the system shown at Fig. 1, which do not characterize the modified system at Fig. 11, have been omitted from the latter, although they are to be understood to be included in the modified system as well. The only differences between these two systems are as follows:

1:—The equalizer 125 with the sliding contact 129 and the line 126 is dispensed with, so that the return line of transmission 127 is connected direct with the negative pole of the battery 114 by means of the lines 124 and 115.

2:—Only a battery 165 is added to the system, it being inserted in the line 130 at the sending station. This battery is so proportioned as to balance the drop of potential of the compensating selenium cell 32, for example when it is left in the dark. As already mentioned, for the sake of clearness all the parts required for synchronizing the sending and receiving apparatus have been omitted from Fig. 13, the binding post 62 of the compensating galvanometer being assumed to be connected direct with the line of transmission 134 which in reality it is not. All the parts at the receiving station are actually the same as in the system shown at Fig. 1.

The current furnished by the battery 114 flows through the lines 121 and 120, the sending selenium cell 2, the line 119, then simultaneously through the lines 118 and 123, the compensating selenium cell 32 and the adjustable resistance 122, and the line 117, thereupon through the lines 116 and 115 back to the battery 114. If both the sending cell 2 and the compensating cell 32 are in the dark, of course the line of transmission 134 will be without current. The moment, however, that the sending cell 2 is exposed to light, the current passing through it will increase in strength and at the same time also the current passing through the compensating cell 32. In consequence of the increase of the drop of potential in the latter cell 32 the tension of the battery 165 in the bridge will be overcome, so that a current will pass through the conductors 57, 58 of the compensating galvanometer and through those 77, 78 of the photographing galvanometer. Then the compensating selenium cell 32 will be exposed to light, so that its resistance and therewith also its drop of potential will decrease. The consequence will be, that the current in the bridge will be reduced, when taking into consideration an infinitely small interval of time. For the behavior of the compensating apparatus is actually like that of a nearly aperiodic galvanometer. The amount of current required for equalizing the inertia of both cells 2 and 32 and for producing the necessary drop of potential in the compensating selenium cell 32 will split off during the increase of the bridge current without producing any vibrations, the same as for example in the aperiodic Deprez's galvanometer the induced counter current will balance in every infinitely small interval of time the excessive acceleration produced by the current set on by force.

The system in the shape of a Wheatstone bridge as illustrated at Fig. 1 is more advantageous than the system in the shape of a potentiometer as shown at Fig. 13. However, in the latter system the several resistances can be so proportioned as to cause most of the current got up by the exposure of the sending selenium cell 2 to light to pass through the bridge, that is the two lines of transmission, so that also this system can be rendered practical and economic.

Following is a theory in a condensed form of my system for compensating the inertia of the sending selenium cell, reference being had to Figs. 14 to 16. In Fig. 15 the current strength $i$ is represented by the ordinate $Oi$ and the time T by the horizontal line $OT$. If now in Fig. 1 the sending selenium cell 2 is at the moment O suddenly exposed to more light which henceforth remains constant, then the increase of the current $i_1$ in this cell 2 will be approximately shown by the curve A and the increase of the current $i_2$ in the compensating cell 32 by the curve B, so that the momentary difference $(i_1 - i_2)$ between them will be the current passing through the bridge, its amount being the respective ordinate of the curve C, as is indicated by the hatched figures. Now that the exposure of the compensating selenium cell 32 to light is effected only by the bridge current and by means of the compensating galvanometer thereby actuated, it is evident, that there will be necessarily a slight slip of time between the two exposures and the two increases of currents thereby produced, which slip of time may be represented by the distance $\tau$ in Fig. 15. In consequence of this the bridge current will show at the commencement a small increase, which is illustrated by the curved part $\beta$ of the line C. This initial increase of the bridge current will produce a greater acceleration of the conductors 57, 58 and 77, 78 in the compensating galvanometer at the sending station in the photographing galvanometer at the receiving station respectively, and this greater acceleration greatly contributes to the exactitude of the image. A similar occurrence will take place if the intensity of the light acting upon the sending selenium cell 2 decreases as is illustrated by Fig. 16. Therein the ordinates and abscissæ and the curves are precisely the same as in Fig. 15. Suppose the intensity of the light acting upon the sending selenium cell 2 suddenly decreases at the moment $t_n$ from a higher value to a lower one, which latter however at once remains constant. We know then from the definition given of the curves, that the current $i_1$ passing through the cell 2 will be represented by the curve A and that $i_2$ passing through the compensating cell 32 by the curve B. In consequence of the above mentioned slip of time $\tau$ between the two changes of intensity of the exposures of the two cells the two descending curves A and B will cross each other, if the change is sufficiently rapid, and this will result in a short reversal of the direction of the bridge current, as is represented by the more densely hatched figures in Fig. 16, in which the horizontal line B T₁ is supposed to be the new axis of zero for the ordinates $(i_1 - i_2)$. This reversal of the bridge current produces in the two galvanometers a forced and accelerated decrease of the deflection. This fact equally contributes to the exactitude of the toning of the image produced at the receiving station. This circumstance is of special importance, since it is during the decrease of the intensity of the light acting upon the sending selenium cell 2, during which both selenium cells invariably show their maximum inertia.

Obviously the compensation of the long-winded inertia is obtained, if without regard to the infinitely small slip of time $\tau$ the curves A and B in Fig. 15 are parallel for like periods, that is to say if for corresponding exposures to light and for like periods we have $\frac{di_1}{dt} = \frac{di_2}{dt}$. When we presume the rapid ascent of both curves A and B to be quicker than the intercepters of both galvanometers can follow, in other words if the ascent takes place within the time of their own vibrations, then we may utilize for example the currents $\varepsilon_1$ and $\varepsilon_2$ in Fig. 15 as measures for the sensitiveness of the two selenium cells that can be taken advantage of. Suppose the sensitiveness of the two selenium cells to be utilized increases for various exposures to light in the same proportion as the influence of the inertia upon the increase of current, then it will be evident, that after the compensation has been effected for two certain distinct exposures of each selenium cell this compensation will be the same for all exposures, provided that the exposures of the sending and compensating selenium cells are proportional to one another. In order to render this possible, it is necessary that the deflection of the compensating galvanometer must not be proportioned to the current $i$ but the consumption of current of this galvanometer for various deflections must stand in the same proportion to the deflection $\alpha$ as the bridge current $(i_1 - i_2)$ to the intensity of the light acting upon both selenium cells. The galvanometer of the special kind described above permits it to obtain such a proportion between the deflection $\alpha$ and the intensity of light I as is illustrated by Fig. 14. The ordinate $i$ gives a measure for the current $i$ and the abscissa a measure for the deflection $\alpha$ of the galvanometer and for the intensity of light I. The curve F represents the consumption of current of the galvanometer, the curve G the same for the unit of deflection for various deflections $\alpha$. The curve D represents the current passing through a sending selenium cell without compensation for a short exposure to light, the curve E represents the bridge current when a compensating selenium cell is employed. If in Fig 14ₐ the deflection $\alpha$ of the galvanometer is represented by the ordinate $O\alpha$ and the intensity of light I by the abscissa $OI$, then the curve H will illustrate the proportion between the deflection $\alpha$ and the intensity of light I for the curve F in Fig. 14. If in Fig. 14 the curves F and E are perfectly identical, the deflection $a$ will be perfectly proportional to I, as is represented by the straight line K in Fig. 14ᵃ. That is to say, the exposure to light of the compensating selenium cell 32 will be proportional to that of the sending selenium cell 2.

In case for two given selenium cells the equation $\frac{di_2}{dt} = \frac{c\, di_1}{dt}$ has been found, in which $c$ is a positive constant larger than 1, for like periods and corresponding exposures to light within sufficiently wide limits for the variations of the light, then it is possible to turn the above equation into $\frac{di_2}{dt} = \frac{di_1}{dt}$ for considerable durations of the exposures by merely reducing the resistance 122, whereby the influence of inertia is practically eliminated.

It is obvious, that the compensation of the inertia will cause the smaller losses of energy, the larger $c$ is, for in this case the proportion between $\varepsilon_1$ and $\varepsilon_2$ will be the larger and hence also their difference which corresponds to the bridge current. If on the contrary for different intensities of light the sensitiveness that can be taken advantage of does not increase at the same rate as the influence of inertia, it is under circumstances still possible to so correct this defect by displacing the exposures of both selenium cells as to practically eliminate the influence of inertia. Following are a few means for effecting the said displacement:

a. The variation of the intensity of light in the compensating apparatus, for example by adjusting its lens 37 (see Fig. 4).

b. The variation of the consumption of current of the galvanometer for the unit of deflection in proportion to the angle of deflection. This may be effected by adjusting the tension of the conductors 57, 58 of the compensating galvanometer, or by partly varying the field density of the electromagnet 41, 40, 41 in the deflecting field, or at last by shifting the juncture 128 of the bridge and therewith the position of zero of the compensating galvanometer.

c. The partial variation of the intensity of light in proportion to the deflection of the compensating galvanometer, for example in the manner, that the permeability to light of the several narrow cylinder-lenses 34, 34 in the row is varied.

With the aid of any one of these means it is on the average possible to obtain a practically sufficient compensation of the inertia of the sending selenium cell.

I claim:

1. In a phototelegraphic system, the combination with a circuit at the transmitting station and comprising two selenium cells in series, of means for exposing one of said two selenium cells to the light passing from a constant source of light through a moving point on a transparent original, a sensitive film or the like at the receiving station, a shunt line leading from said circuit at a point between the two selenium cells to the receiving station and back to the circuit at a point outside the two selenium cells, means inserted in said shunt line and adapted to control the exposure of the other selenium cell to a constant source of light in accordance with that of the first selenium cell, and means inserted in said shunt line and adapted to control the exposure of a moving point on said sensitive film or the like to a constant source of light in accordance with that of the first selenium cell.

2. In a phototelegraphic system, the combination with a circuit at the transmitting station and comprising two selenium cells in series, of means for exposing one of said two selenium cells to the light passing from a constant source of light through a moving point on a transparent original, a sensitive film or the like at the receiving station, a shunt line leading from said circuit at a point between the two selenium cells to the receiving station and back to the circuit at a point outside the two selenium cells, a galvanometer inserted in said shunt line and adapted to control the exposure of the other selenium cell to a constant source of light in accordance with that of the first selenium cell, and another galvanometer inserted in said shunt line and adapted to control the exposure of a moving point on said sensitive film or the like to a constant source of light in accordance with that of the first selenium cell.

3. In a phototelegraphic system, the combination with a circuit at the transmitting station and comprising a source of current and two selenium cells in series, of means for exposing one of said two selenium cells to the light passing from a constant source of light through a moving point on a transparent original, a sensitive film or the like at the receiving station, an equalizer shunted to said source of current, a shunt line leading from said circuit at a point between the two selenium cells to the receiving station and back to a point on said equalizer, means inserted in said shunt line and adapted to control the exposure of the other selenium cell to a constant source of light in accordance with that of the first selenium cell, and means inserted in said shunt line and adapted to control the exposure of a moving point on said sensitive film or the like to a constant source of light in accordance with that of the first selenium cell.

4. In a phototelegraphic system, the combination with a circuit at the transmitting station and comprising a source of current and two selenium cells in series, of means for exposing one of said two selenium cells to the light passing from a constant source of light through a moving point on a transparent original, a sensitive film or the like at the receiving station, an equalizer shunted to said source of current, a shunt line leading from said circuit at a point between the two selenium cells to the receiving station and back to a point on said equalizer, a galvanometer inserted in said shunt line and adapted to control the exposure of the other selenium cell to a constant source of light in accordance with that of the first selenium cell, and another galvanometer inserted in said shunt line and adapted to control the exposure of a moving point on said sensitive film or the like to a constant source of light in accordance with that of the first selenium cell.

5. In a phototelegraphic system, the combination with a circuit at the transmitting station and comprising a source of current and two selenium cells in series, of means for exposing one of said two selenium cells to the light passing from a constant source of light through a moving point on a transparent original, a sensitive film or the like at the receiving station, an outer circuit leading from said circuit at a point between the two selenium cells to the receiving station and back to the negative pole of said source of current, a second source of current inserted in said outer circuit and adapted to normally balance the drop of potential of the other selenium cell, means inserted in said outer circuit and adapted to control the exposure of the other selenium cell to a constant source of light in accordance with that of the first selenium cell, and means inserted in said outer circuit and adapted to control the exposure of a moving point on said sensitive film or the like to a constant source of light in accordance with that of the first selenium cell.

6. In a phototelegraphic system, the combination with a circuit at the transmitting station and comprising a source of current and two selenium cells in series, of means for exposing one of said two selenium cells to the light passing from a constant source of light through a moving point on a transparent original, a sensitive film or the like at the receiving station, an outer circuit leading from said circuit at a point between the two selenium cells to the receiving station and back to the negative pole of said source of current, a second source of current inserted in said outer circuit and adapted to normally balance the drop of potential of the other selenium cell, a galvanometer inserted in said outer circuit and adapted to control the exposure of the other selenium cell to a constant source of light in accordance with that of the first selenium cell, and another galvanometer inserted in said outer circuit and adapted to control the exposure of a moving point on said sensitive film or the like to a constant source of light in accordance with that of the first selenium cell.

7. In a phototelegraphic system, the combination with a circuit at the transmitting station and comprising a source of current and a first and a second selenium cells in series, of means for exposing said first selenium cell to the light passing from a constant source of light through a moving point on a transparent original, an equalizer shunted to said source of current, an adjustable resistance shunted to said second selenium cell for adjusting same to said first selenium cell, a sensitive film or the like at the receiving station, a shunt line leading from said circuit at a point between the two selenium cells to the receiving station and back to a point on said equalizer, means inserted in said shunt line and adapted to control the exposure of said second selenium cell to a constant source of light in accordance with that of said first selenium cell, and means inserted in said shunt line and adapted to control the exposure of a moving point on said sensitive film or the like to a constant source of light in accordance with that of said first selenium cell.

8. In a phototelegraphic system, the combination with a circuit at the transmitting station and comprising a source of current and a first and a second selenium cells in series, of means for exposing said first selenium cell to the light passing from a constant source of light through a moving point on a transparent original, an equalizer shunted to said source of current, an adjustable resistance shunted to said second selenium cell for adjusting same to said first selenium cell, a sensitive film or the like at the receiving station, a shunt line leading from said circuit at a point between the two selenium cells to the receiving station and back to a point on said equalizer, a galvanometer inserted in said shunt line and adapted to control the exposure of said second selenium cell to a constant source of light in accordance with that of said first selenium cell, and another galvanometer inserted in said shunt line and adapted to control the exposure of a moving point on said sensitive film or the like to a constant source of light in accordance with that of said first selenium cell.

9. In a phototelegraphic system, the combination with a circuit at the transmitting station and comprising a source of current and a first and a second selenium cells in series, of means for exposing said first selenium cell to the light passing from a constant source of light through a moving point on a transparent original, an adjustable resistance shunted to said second selenium cell for adjusting same to said first selenium cell, a sensitive film or the like at the receiving station, an outer circuit leading from said circuit at a point between the two selenium cells to the receiving station and back to the negative pole of said source of current, a second source of current inserted in said outer circuit and adapted to normally balance the drop of potential of said second selenium cell, means inserted in said outer circuit and adapted to control the exposure of said second cell to a constant source of light in accordance with that of said first selenium cell, and means inserted in said outer circuit and adapted to control the exposure of a moving point on said sensitive film or the like to a constant source of light in accordance with that of said first selenium cell.

10. In a phototelegraphic system, the combination with a circuit at the transmitting station and comprising a source of current and a first and a second selenium cells in series, of means for exposing said first selenium cell to the light passing from a constant source of light through a moving point on a transparent original, an adjustable resistance shunted to said second selenium cell for adjusting same to said first selenium cell, a sensitive film or the like at the receiving station, an outer circuit leading from said circuit at a point between the two selenium cells to the receiving station and back to the negative pole of said source of current, a second source of current inserted in said outer circuit and adapted to normally balance the drop of potential of said second selenium cell, a galvanometer inserted in said outer circuit and adapted to control the exposure of said second selenium cell to a constant source of light in accordance with that of said first selenium cell, and another galvanometer inserted in said outer circuit and adapted to control the exposure of a moving point on said sensitive film or the like to a constant source of light in accordance with that of said first selenium cell.

11. In a phototelegraphic system, the combination with a transmitting apparatus comprising a transparent platen-roll for a transparent original, a selenium cell and a device for projecting a pencil of rays of light through a moving point on the original on the selenium cell, of a compensating apparatus comprising a selenium cell a horseshoe magnet, a frame between the poles of same, a conductor stretched in the frame, an intercepter on the middle of the conductor and a device controlled by the intercepter for projecting a pencil of rays of light across the poles on the selenium cell, a circuit comprising in series a source of current and the two selenium cells of said transmitting apparatus and said compensating apparatus, a receiving platen-roll for a sensitive film or the like, a photographing apparatus comprising a horseshoe magnet, a frame between the poles of same, a conductor stretched in the frame, an intercepter on the middle of the conductor and a device controlled by the intercepter for projecting a pencil of rays of light across the poles on a moving point on said sensitive film or the like, a shunt line including the conductor of said compensating apparatus and connecting said circuit at a point between the two selenium cells with one pole of the conductor of said photographing apparatus, and a second shunt line connecting the other pole of this conductor with a point on said source of current.

12. In a phototelegraphic system, the combination with a transmitting apparatus comprising a transparent platen-roll for a transparent original, a selenium cell and a device for projecting a pencil of rays of light through a moving point on the original on the selenium cell, of a compensating apparatus comprising a selenium cell a horseshoe magnet, a frame between the poles of same, a conductor stretched in the frame, an intercepter on the middle of the conductor and a device controlled by the intercepter for projecting a pencil of rays of light across the poles on the selenium cell, a circuit comprising in series a source of current and the two selenium cells of said transmitting apparatus and said compensating apparatus, an equalizer shunted to said source of current, a receiving platen-roll for a sensitive film or the like, a photographing apparatus comprising a horseshoe magnet, a frame between the poles of same, a conductor stretched in the frame, an intercepter on the middle of the conductor and a device controlled by the intercepter for projecting a pencil of rays of light across the poles on a moving point on said sensitive film or the like, a shunt line including the conductor of said compensating apparatus and connecting said circuit at a point between the two selenium cells with one pole of the conductor of said photographing apparatus, and a second shunt line connecting the other pole of this conductor with a point on said equalizer.

13. In a phototelegraphic system, the combination with a transmitting apparatus comprising a transparent platen-roll for a transparent original, a selenium cell and a device for projecting a pencil of rays of light through a moving point on the original on the selenium cell, of a compensating apparatus comprising a selenium cell, a horseshoe magnet, a frame between the poles of same, a conductor stretched in the frame, an intercepter on the middle of the conductor and a device controlled by the intercepter for projecting a pencil of rays of light across the poles on the selenium cell, a circuit comprising in series a source of current and the two selenium cells of said transmitting apparatus and said compensating apparatus, a receiving platen-roll for a sensitive film or the like, a photographing apparatus comprising a horseshoe magnet, a frame between the poles of same, a conductor stretched in the frame, an intercepter on the middle of the conductor and a device controlled by the intercepter for projecting a pencil of rays of light across the poles on a moving point on said sensitive film or the like, a line including the conductor of said compensating apparatus and connecting said circuit at a point between the two selenium cells with one pole of the conductor of said photographing apparatus, a second line connecting the other pole of this conductor with the negative pole of said source of current, and a second source of current inserted in said line and adapted to normally balance the drop of potential of the selenium cell of said compensating apparatus.

14. In a phototelegraphic system, the combination with a transmitting apparatus comprising a transparent platen-roll for a transparent original, a selenium cell and a device for projecting a pencil of rays of light through a moving point on the original on the selenium cell, of means for driving the platen-roll of said transmitting apparatus, a compensating apparatus comprising a selenium cell a horseshoe magnet, a frame between the poles of same, a conductor stretched in the frame, an intercepter on the middle of the conductor and a device controlled by the intercepter for projecting a pencil of rays of light across the poles on the selenium cell, a circuit comprising in series a source of current and the two selenium cells of said transmitting apparatus and said compensating apparatus, a receiving platen-roll for a sensitive film or the like, means for driving said receiving platen-roll, a photographing apparatus comprising a horseshoe magnet, a frame between the poles of same, a conductor stretched in the frame, an intercepter on the middle of the conductor and a device controlled by the intercepter for projecting a pencil of rays of light across the poles on a moving point on said sensitive film or the like, a shunt line including the conductor of said compensating apparatus and connecting said circuit at a point between the two selenium cells with one pole of the conductor of said photographing apparatus, a second line connecting the other pole of this conductor with a point on said source of current, and means for synchronizing the platen-roll of said transmitting apparatus and said receiving platen-roll.

15. In a phototelegraphic system, the combination with a transmitting apparatus comprising a transparent platen-roll for a transparent original, a selenium cell and a device for projecting a pencil of rays of light through a moving point on the original on the selenium cell, of means for driving the platen-roll of said transmitting apparatus, a compensating apparatus comprising a selenium cell a horseshoe magnet, a frame between the poles of same, a conductor stretched in the frame, an intercepter on the middle of the conductor and a device controlled by the intercepter for projecting a pencil of rays of light across the poles on the selenium cell, a circuit comprising in series a source of current and the two selenium cells of said transmitting apparatus and said compensating apparatus, an equalizer shunted to said source of current, a receiving platen-roll for a sensitive film or the like, means for driving said receiving platen-roll, a photographing apparatus comprising a horseshoe magnet, a frame between the poles of same, a conductor stretched in the frame, an intercepter on the middle of the conductor and a device controlled by the intercepter for projecting a pencil of rays of light across the poles on a moving point on said sensitive film or the like, a shunt line including the conductor of said compensating apparatus and connecting said circuit at a point between the two selenium cells with one pole of the conductor of said photographing apparatus, a second line connecting the other pole of this conductor with a point on said equalizer, and means for synchronizing the platen-roll of said transmitting apparatus and said receiving platen-roll.

16. In a phototelegraphic system, the combination with a transmitting apparatus comprising a transparent platen-roll for a transparent original, a selenium cell and a device for projecting a pencil of rays of light through a moving point on the original on the selenium cell, of means for driving the platen-roll of said transmitting apparatus, a compensating apparatus comprising a selenium cell a horseshoe magnet, a frame between the poles of same, a conductor stretched in the frame, an intercepter on the middle of the conductor and a device controlled by the intercepter for projecting a pencil of rays of light across the poles on the selenium cell, a circuit comprising in series a source of current and the two selenium cells of said transmitting apparatus and said compensating apparatus, a receiving platen-roll for a sensitive film or the like, means for driving said receiving platen-roll, a photographing apparatus comprising a horseshoe magnet, a frame between the poles of same, a conductor stretched in the frame, an intercepter on the middle of the conductor and a device controlled by the intercepter for projecting a pencil of rays of light across the poles on a moving point on said sensitive film or the like, a line including the conductor of said compensating apparatus and connecting said circuit at a point between the two selenium cells with one pole of the conductor of said photographing apparatus, a second line connecting the other pole of this conductor with the negative pole of said source of current, a second source of current inserted in said line and adapted to normally balance the drop of potential of the selenium cell of said compensating apparatus, and means for synchronizing the platen-roll of said transmitting apparatus and said receiving platen-roll.

ARTHUR KORN.

Witnesses:
 WOLDEMAR HAUPT,
 HENRY HASPER.